United States Patent [19]

Eichenauer et al.

[11] Patent Number: 4,647,652

[45] Date of Patent: Mar. 3, 1987

[54] MOLDING MATERIALS PROCESSED TO BE FREE FROM SALTS

[75] Inventors: Herbert Eichenauer, Dormagen; Karl-Heinz Ott, Leverkusen, both of Fed. Rep. of Germany

[73] Assignee: Bayer Aktiengesellschaft, Leverkusen, Fed. Rep. of Germany

[21] Appl. No.: 854,655

[22] Filed: Apr. 15, 1986

Related U.S. Application Data

[63] Continuation of Ser. No. 698,863, Feb. 6, 1985, abandoned.

[30] Foreign Application Priority Data

Feb. 18, 1984 [DE] Fed. Rep. of Germany ....... 3405940

[51] Int. Cl.$^4$ ................................................ C08J 3/16
[52] U.S. Cl. ..................................... 528/486; 523/335
[58] Field of Search ........................................ 528/486

[56] References Cited

U.S. PATENT DOCUMENTS

| | | |
|---|---|---|
| Re. 30,378 | 8/1980 | Bice et al. ............................ 528/486 |
| 3,483,174 | 12/1969 | Libengood ........................... 528/486 |
| 4,031,302 | 6/1977 | Shimizu et al. ..................... 528/486 |
| 4,113,796 | 9/1978 | Bischoff et al. ................. 528/501 X |
| 4,250,273 | 2/1981 | Bohm .................................. 525/232 |
| 4,357,270 | 11/1982 | Pippa et al. ........................ 523/335 |
| 4,429,114 | 1/1984 | Sugimori et al. .................. 528/486 |
| 4,491,658 | 1/1985 | Sugimori et al. .................. 528/486 |
| 4,522,959 | 6/1985 | Lindner .............................. 525/232 |

OTHER PUBLICATIONS

The Condensed Chemical Dictionary, Hawley, 1971 p. 714.

*Primary Examiner*—Paul R. Michl
*Attorney, Agent, or Firm*—Connolly & Hutz

[57] ABSTRACT

The invention relates to elastic-thermoplastic and thermoplastic pulverulent moulding materials and to mixtures thereof, which can be processed as thermoplastics, with elastic moulding materials, which are prepared from the corresponding aqueous latices under salt-free conditions using a purely organic precipitating agent system.

7 Claims, No Drawings

MOLDING MATERIALS PROCESSED TO BE FREE FROM SALTS

This application is a continuation of application Ser. No. 698,863, filed Feb. 6, 1985, abandoned.

The present invention relates to elastic-thermoplastic and thermoplastic pulverulent moulding materials and mixtures thereof, which can be processed as thermoplastics, with elastic moulding materials, which are prepared from the corresponding aqueous latices under saltfree conditions using a purely organic precipitating agent system.

Aqueous polymer latices are usually converted into polymer powders by triggering off coagulation of the latex particles by addition of large amounts of aqueous salt solutions or dilute acids. Examples of this are described in U.S. Pat. No. 2,366,460, U.S. Pat. No. 3,108,983, U.S. Pat. No. 3,248,455 and DE-AS (German Published Specification) No. 1,958,498.

Conversion of latices into a solid polymer powder without using salt solutions is possible only in special cases, thus, for example, by combined application of shearing forces and pressure in accordance with U.S. Pat. No. 4,299,952. However, all these processes necessitate treatment of the effluent or a great technical effort and energy expenditure.

The invention relates to elastic-thermoplastic and thermoplastic pulverulent moulding materials and mixtures thereof, which can be processed as thermoplastics, with elastic moulding materials, which are coagulated from the corresponding aqueous latices using a precipitation reagent comprising (A) 0.1 to 3.0% by weight (based on the latex solid) of a polyvinyl acetate with a molecular weight of 30,000 to 150,000 and a degree of hydrolysis of between 60 and 96%, in the form of an aqueous solution, and (B) 0.01 to 1.0% by weight (based on the latex solid) of a proton donor, preferably a carboxylic acid, at temperatures between 75° C. and 140° C., preferably between 80° C. and 100° C., and are isolated from the hot aqueous phase at 60° to 140° C., preferably 70° to 100° C., by filtration, centrifugation or other separation processes.

Compared with the previously known pulverulent moulding materials which can be processed as thermoplastics, the moulding materials according to the invention are distinguished by the fact that their coagulation takes place under salt-free conditions, only minor amounts of the proton donor are employed, and all the reagents used for the precipitation are biologically degradable.

Polyvinyl acetates with a molecular weight of 30,000 to 150,000 and a degree of hydrolysis of 60 to 96% are employed as those polyvinyl acetates which are effective according to the invention. Those with a degree of hydrolysis of 75 to 95% are preferred.

The amount of partially hydrolyzed polyvinyl acetate employed is 0.1 to 3.0% by weight, preferably 0.1 to 1.0% by weight (in each case based on the latex solid).

Proton donors which can be used are all the Brönsted acids, preferably carboxylic acids or acids containing carbon, or compounds from which the abovementioned acids are formed under the reaction conditions used. Examples are formic acid, acetic acid, propionic acid, oxalic acid, acetic anhydride and carbon dioxide. They are used in amounts of 0.01 to 1.0% by weight (based on the latex solid).

The partially hydrolyzed polyvinyl acetate and acid component can be added to the latex separately or after prior mixing. They can be added at any desired temperature between room temperature and 100° C. Particularly rapid setting of particles is effected when the solution of partially hydrolyzed polyvinyl acetate is stirred in at room temperature and the acid is added at temperatures >80° C.

The coagulated mould material is processed at temperatures from 60° to 140° C., preferably 70° to 100° C. in order to prevent redispersion of the coagulate.

According to the invention, all elastic-thermoplastic and thermoplastic polymers and mixtures thereof, which can be processed as thermoplastics, with elastic polymers in the form of an aqueous emulsion can be precipitated if $\leq 5$ parts by weight (per 100 parts by weight of latex solid) of an anionic emulsifier has been used in their preparation. Latices which have been prepared using $\leq 2$ parts by weight of emulsifier are preferred. Examples of such emulsifiers are the sodium, potassium or ammonium salts of long-chain fatty acids with 10 to 20 C atoms, for example potassium oleate, salts of disproportionated abietic acid, salts of long-chain benzenesulphonates, for example Na n-dodecylbenzenesulphonate, and salts of long-chain sulphonic acids, for example the sodium salts of $C_9$–$C_{18}$-alkylsulphonic acid mixtures.

Examples of latices which can be coagulated and which lead to the pulverulent moulding materials according to the invention are polymethyl methacrylate, polyvinyl chloride, polystyrene, copolymers and terpolymers of styrene, optionally substituted in the nucleus or side chain, with other monomers which form resins, such as (meth)acrylonitrile, methyl (meth)acrylate, α-methylstyrene, p-methylstyrene, vinyltoluene and other styrenes substituted in the nucleus or side chain, N(cyclo)-alkylmaleimides and N(alkyl)-phenylmaleimides, for example styrene/acrylonitrile copolymers, styrene/methyl methacrylate copolymers or α-methylstyrene/acrylonitrile copolymers, the elastic-thermoplastic polymers prepared by polymerisation of resin-forming unsaturated compounds in the presence of an elastomeric component, for example polybutadiene, polyisoprene or acrylate rubber, and mixtures of the abovementioned thermoplastic resin latices and of the latices of elastic-thermoplastic polymers with elastomeric latices, such as, for example, polybutadiene, polyisoprene, poly-n-butyl acrylate, butadiene/styrene copolymers and butadiene/acrylonitrile copolymers, and mixtures of a thermoplastic resin latex, the latex of an elastic-thermoplastic polymer and an elastomeric latex.

Preferred latices here are those which are obtained by mixing the latex of an elastomeric component, for example polybutadiene or copolymers of butadiene with acrylonitrile and/or styrene, with the latex of a rigid and brittle component, for example a styrene, α-methylstyrene or p-methylstyrene/acrylonitrile copolymer, and, if appropriate, the latex of an elastic-thermoplastic polymer, for example the grafting product of a monomer which forms a resin, such as, for example, styrene, α-methylstyrene, p-methylstyrene, (meth)acrylonitrile or methyl (meth)acrylate or mixtures thereof on polybutadiene, and then coagulating the latex mixture in the manner according to the invention, using the precipitation reagent described above.

Latices of ABS polymers with, for example, the following composition are also preferred:
(A) 5 to 100% by weight, preferably 5 to 80% by weight, of a graft copolymer prepared by grafting polymerisation of
  (a) 10 to 95% by weight, preferably 10 to 80% by weight, of a mixture of
    1. 50 to 90% by weight of styrene, alkylstyrene, methyl methacrylate or mixtures thereof and
    2. 50 to 10% by weight of acrylonitrile, alkylacrylonitrile, alkyl methacrylate or mixtures thereof onto
  (b) 90 to 5% by weight, preferably 90 to 20% by weight, of a polymer of a conjugated diolefine containing at least 80% by weight of copolymerised conjugated diolefines, and
(B) 95 to 0% by weight, preferably 95 to 20% by weight, of a thermoplastic copolymer of
  (a) 50 to 95% by weight of styrene, alkylstyrene, methyl methacrylate or mixtures thereof and
  (b) 50 to 5% by weight of acrylonitrile, alkylacrylonitrile, alkyl methacrylate or mixtures thereof, in which the total sum of resin-forming monomers in components (A) and (B) should not fall below 40% by weight.

The pulverulent ABS moulding materials according to the invention can be prepared, for example, as follows:
(a) a graft polymer (A) and a copolymer (B) are prepared by emulsion polymerisation, the latices are mixed and the resulting emulsion is coagulated using the precipitation reagent consisting of partially hydrolyzed polyvinyl acetate and carboxylic acid.
(b) The total amount of resin-forming monomers, within the limits stated, is grafted onto the diene rubber and the graft polymer emulsion obtained is then coagulated using the precipitation reagent consisting of partially hydrolyzed polyvinyl acetate and carboxylic acid. The moulded articles obtained by processing by injection moulding from the ABS moulding materials thus prepared have a significantly improved surface gloss.

EXAMPLES AND COMPARISON EXAMPLES

The invention is illustrated in more detail in the following examples. Parts mentioned are parts by weight and always relate to solid constituents or polymerisable constituents.

EXAMPLE 1

A mixture of 3.8 kg of a 33% by weight graft polymer latex of 35 parts of styrene and 15 parts of acrylonitrile on 50 parts of polybutadiene, for the preparation of which 1.5 parts of the sodium salt of disproportionated abietic acid was used as the emulsifier, 7.2 kg of a 45% by weight styrene/acrylonitrile copolymer latex prepared by copolymerisation of 72 parts of styrene and 28 parts of acrylonitrile using 2.0 parts of the sodium salt of disproportionated abietic acid as the emulsifier, and 2.3 kg of a 22% by weight copolymer latex of 65 parts of buadiene and 35 parts of acrylonitrile, which was prepared using 2.0 parts of the sodium salt of an n-alkylsulphonic acid as the emulsifier, is metered into a solution of 50 g of partially hydrolyzed polyvinyl acetate (Mowiol 26-88 from Hoechst AG) and 50 g of glacial acetic acid in 25 liters of demineralised water, and the mixture is stirred at 98° C. until the polymer has set. The polymer mixture is isolated by filtration of the hot precipitation mixture over a plane filter. The filtrate which runs out is clear and has no polymer content.

COMPARISON EXAMPLE A

The latex mixture described in Example 1 is metered into a solution of 740 g of magnesium sulphate ($MgSO_4.7H_2O$) and 372 g of acetic acid in 37.1 liters of demineralised water in a precipitating kettle with a propeller-type stirrer, and the mixture is warmed to 95° C. and stirred until the polymer particles have set. After filtration of the precipitation mixture, the polymer powder is dried. The aqueous phase separated off has a small content of floating particles.

COMPARISON EXAMPLE B

The latex mixture described in Example 1 is added to a solution of 495 g of magnesium sulphate ($MgSO_4.7H_2O$) and 248 g of acetic acid in 37.1 liters of demineralised water at room temperature in a precipitating kettle with a propeller-type stirrer and the mixture is warmed to 95° C. and stirred until the polymer particles have set, after which the precipitation mixture is filtered. The aqueous phase separated off contains about 1.7% by weight of polymer latex which has not precipitated.

COMPARISON EXAMPLE C

The latex mixture described in Example 1 is metered into a solution of 50 g of partially hydrolyzed polyvinyl acetate (Mowiol 26-88 from Hoechst AG) in 25 liters of demineralised water at room temperature in a precipitating kettle with a propeller-type stirrer, and the mixture is stirred at 98° C. for 30 minutes. Subsequent filtration of the hot precipitation mixture over a plane filter and drying of the solid gives a precipitated amount of 4.4 kg of polymer. The remaining amount of polymer (12% by weight of the amount employed) is still in latex form.

COMPARISON EXAMPLE D

The latex mixture described in Example 1 is metered into a solution of 50 g of glacial acetic acid in 25 liters of demineralised water at room temperature in a precipitating kettle with a propeller-type stirrer, and the mixture is stirred at 98° C. for 30 minutes. Thereafter, 28% by weight of the amount of polymer employed is still in latex form, and complete coagulation is not possible.

EXAMPLE 2

A mixture of 9.45 kg of a 45% by weight styrene acrylonitrile polymer latex prepared by copolymerisation of 72 parts of styrene and 28 parts of acrylonitrile using 2.0 parts of sodium salt of disproportionated abietic acid as the emulsifier and 1.12 kg of a 67% by weight copolymer latex of 32 parts of styrene and 78 parts of butadiene, which was prepared using 1.5 parts of the sodium salt of disproportionated abietic acid, is metered into a solution of 40 g of partially hydrolyzed polyvinyl acetate (Mowiol 18-88 from Hoechst AG) and 50 g of glacial acetic acid in 30 liters of demineralised water, and the mixture is stirred until the polymer particles have set. The polymer mixture is isolated by filtration of the hot precipitation mixture; the filtrate water is clear and has no latex content.

EXAMPLE 3

A mixture of 6.0 kg of a 33% by weight graft polymer latex of 35 parts of styrene and 15 parts of acrylonitrile on 50 parts of polybutadiene, for the preparation of which 1.5 parts of the sodium salt of disproportionated abietic acid were used as the emulsifier, and 6.7 kg of a 45% by weight styrene/acrylonitrile copolymer latex prepared by copolymerisation of 72 parts of styrene and 28 parts of acrylonitrile using 2.0 parts of the sodium salt of disproportionated abietic acid as the emulsifier, is metered into a solution of 25 g of partially hydrolized polyvinyl acetate (Mowiol 26-88 from Hoechst AG) and 25 g glacial acetic acid in 25 liters of demineralised water at 40° C. The mixture is warmed to 95° to 98° C., with stirring, and stirred until the polymer particles have set. Working up is effected by filtration of the hot precipitation mixture and drying of the polymer. The filtrate is clear and contains no residues of the latex employed.

EXAMPLE 4

A mixture of 13.6 kg of a 33% by weight graft polymer latex of 35 parts of styrene and 15 parts of acrylonitrile on 50 parts of polybutadiene, for the preparation of which 1.5 parts of the sodium salt of disproportionated abietic acid were used as the emulsifier, and 1.4 kg of a 37% by weight poly-n-butyl acrylate latex, which was prepared using 1.3 parts of the sodium salt of $C_9$–$C_{18}$-alkylsulphonic acid mixtures, is metered into a solution of 45 g of partially hydrolyzed polyvinyl acetate (Mowiol 18-88 from Hoechst AG) and 50 g of glacial acetic acid in 25 liters of demineralised water at room temperature. The mixture is warmed to 98° C., with stirring, and the hot precipitation mixture is worked up by filtration. The aqueous phase separated off is clear and has no polymer content.

The filtrate waters obtained after carrying out the precipitations (Examples 1 to 4 and Comparison Examples A to D) were in each case freed from any latex content present by addition of methanol and filtration, after which the solutions were evaporated and the salt content was determined.

The results are summarised in Table 1.

According to these results, the salt content in the effluent can be drastically reduced by using the precipitation reagent according to the invention.

TABLE 1

Investigations on the filtrate water

| Example No. | Salt content of the filtrate water [mg/liter] | Content of latex which can be coagulated by methanol in the filtrate water |
| --- | --- | --- |
| 1 | 39 | none |
| A (comparison) | 6226 | low |
| B (comparison) | 3759 | high |
| C (comparison) | 19 | very high |
| D (comparison) | 43 | very high |
| 2 | 48 | none |
| 3 | 27 | none |
| 4 | 31 | none |

EXAMPLE 5

A precipitation solution of 24.7 liters of demineralised water and 24.7 g of partially hydrolyzed polyvinyl acetate (Mowiol 26-88 from Hoechst AG) is prepared in a precipitating kettle with a propeller-type stirrer. 15 kg of a 33% by weight graft polymer latex of 35 parts of styrene and 15 parts of acrylonitrile on 50 parts of polybutadiene, for the preparation of which 1.5 parts of the sodium salt of disproportionated abietic acid were used as the emulsifier, are metered into this solution at room temperature, after which the mixture is warmed to 80° to 85° C. When coagulation starts, 24.7 g of glacial acetic acid are added and the mixture is stirred at 95° C. until the polymer particles have set. The polymer powder is separated off from the aqueous phase of filtration of the hot precipitation mixture and is dried. The water separated off is clear and has no polymer content.

COMPARISON EXAMPLE E 15 kg of the latex described in Example 5 are metered into a solution of 495 g of magnesium sulphate ($MgSO_4.7H_2O$) and 248 g of acetic acid in 24.7 liters of demineralised water at room temperature in a precipitating kettle with a propeller-type stirrer, and the mixture is warmed to 95° C. and stirred until the polymer particles have set. After filtration of the precipitation mixture, the polymer powder is dried. The aqueous phase separated off has a low content of floating particles.

COMPARISON EXAMPLE F 15 kg of the latex described in Example 5 are metered into a solution of 24.7 of partially hydrolyzed polyvinyl acetate (Mowiol 26-88 from Hoechst AG) in 24.7 liters of demineralised water at room temperature in a precipitating kettle with a propeller-type stirrer, and the mixture is warmed to 95° C. Even after the mixture has been stirred at this temperature for 30 minutes, 4.5% by weight of the amount of polymer employed is still in latex form, and complete coagulation is not possible.

COMPARISON EXAMPLE G 15 kg of the latex described in Example 5 are metered into a solution of 24.7 g of glacial acetic acid in 24.7 liters of demineralised water at room temperature in a precipitating kettle with a propeller-type stirrer, and the mixture is warmed to 95° C. After the mixture has been stirred at this temperature for 30 minutes, it is filtered hot. After drying, 4.52 kg of polymer are obtained, and the remaining amount of polymer (8.6% by weight of the amount employed) is still in latex form.

EXAMPLE 6

A mixture consisting of 495 g of 5% by weight of an aqueous solution of partially hydrolyzed polyvinyl acetate (Mowiol 26-88 from Hoechst AG) and 24 g of glacial acetic acid are added to 15 kg of the latex described in Example 5 in a precipitating kettle, with stirring, and the mixture is stirred at 95° C. for 30 minutes. The paste-like coagulate obtained is dehydrated by filtration over a plane filter and then dried. The water separated off is clear and contains no polymer.

EXAMPLE 7

15 kg of a 33% by weight graft polymer latex of 35 parts of styrene and 15 parts of acrylonitrile on 200 parts of polybutadiene, for the preparation of which 1.0 part of the potassium salt of oleic acid was used as the emulsifier, are introduced into a precipitating kettle with a propeller-type stirrer, into which a solution of 19.8 g of partially hydrolyzed polyvinyl acetate (Mowiol 18-88 from Hoechst AG) and 29.7 g of glacial acetic acid in 24.7 liters of demineralised has been introduced. The mixture is warmed to 95° C., with stirring, and kept at this temperature until the polymer particles have set.

The polymer is isolated by filtration of the hot precipitation mixture. The filtrate is clear and contains no polymer particles.

EXAMPLE 8

10 kg of a 45% by weight styrene/acrylonitrile copolymer prepared by copolymerisation of 72 parts of styrene and 28 parts of acrylonitrile using 2.0 parts of the sodium salt of disproportionated abietic acid as the emulsifier are added to a solution of 22.5 g of partially hydrolyzed polyvinyl acetate (Mowiol 26-88 from Hoechst AG) and 22.5 g of glacial acetic acid in 22.5 liters of demineralised water in a precipitating kettle with a propeller-type stirrer at 40° C., after which the mixture is warmed to 95° C. and is stirred at this temperature until the polymer particles have set. The polymer is separated off by filtration of the hot precipitation mixture over a plane filter. The clear water which runs out has no polymer content.

EXAMPLE 9

A mixture of 6 kg of the latex used in Example 5 and 6.7 kg of the latex used in Example 8 is metered into a solution of 25 g of partially hydrolyzed polyvinyl acetate (Mowiol 18-88 from Hoechst AG) and 25 g of glacial acetic acid in 25 liters of demineralised water. The mixture is warmed to 95° to 98° C., with stirring, and is stirred until the polymer particles have set. Working up is effected by filtration of the hot precipitation mixture and drying of the polymer. The filtrate is clear and contains no residues of the latex employed.

COMPARISON EXAMPLE H

The latex mixture described in Example 9 is added to a solution of 500 g of magnesium sulphate ($MgSO_4 \cdot 7H_2O$) and 250 g of glacial acetic acid in 25 liters of demineralised water, with stirring, after which the resulting mixture is warmed to 95° C. The mixture is stirred until the polymer particles have set, after which the polymer is filtered off and dried.

Testing of the moulding materials

Moulding materials 5, 6, 7, 9, E and H (in each case F parts) were mixed with H parts of a styrene/acrylonitrile = 72:28 copolymer with a $M_w$ of about 115,000 and an $(M_w/M_n) - 1 \leq 2.0$, and moulding material 8 (F parts) was mixed with P parts of a graft rubber of 35 parts of styrene and 15 parts of acrylonitrile on 50 parts of polybutadiene and 2 parts of a lubricant, in a kneader, and the mixtures were then injection-moulded to standard small bars, a sheet (for evaluation of the surface) and a helix (for evaluation of the flow distance).

The notched impact strength was measured at room temperature ($a_k^{RT}$) and at −40° C. ($a_k^{-40°C}$) in accordance with DIN 53,453 (units: $kJ/m^2$), the ball indentation hardness ($H_c$) was measured in accordance with DIN 53,456 (units: $N/mm^2$), the heat distortion point (Vicat B) was measured in accordance with DIN 53,460 (units: °C.) and the flow distance was measured at 220° C. on a spiral about 8 mm wide and about 2 mm thick (units: cm). The gloss was evaluated by the scale A - H in accordance with DE-AS (German Published Specification) No. 2,420,358.

As can be seen from Table 2, the use of the moulding materials according to the invention leads to moulded articles with a better surface gloss.

TABLE 2

Compositions and test data of the mixtures

| Moulding material used, from Example No. | F | H | P | $a_k^{RT}$ | $a_k^{-40°C}$ | $H_c$ | Vicat B | Flow distance | Gloss level |
|---|---|---|---|---|---|---|---|---|---|
| 5 | 40 | 60 | — | 18 | 11 | 90 | 97 | 40 | F |
| 5 | 60 | 40 | — | 20 | 15 | 63 | 93 | 36 | F |
| E (comparison) | 40 | 60 | — | 17 | 11 | 90 | 96 | 40 | D-E |
| E (comparison) | 60 | 40 | — | 19 | 15 | 62 | 92 | 35 | D |
| 6 | 40 | 60 | — | 18 | 10 | 91 | 97 | 39 | F |
| 6 | 60 | 40 | — | 21 | 15 | 64 | 93 | 35 | F |
| 7 | 25 | 75 | — | 16.5 | 8 | 88 | 96 | 42 | E |
| 7 | 35 | 65 | — | 20 | 13 | 63 | 92 | 37 | E |
| 8 | 60 | — | 40 | 17.5 | 12 | 91 | 97 | 41 | F |
| 8 | 40 | — | 60 | 19.5 | 14 | 65 | 94 | 36 | F |
| 9 | 100 | — | — | 18 | 12 | 91 | 98 | 41 | F |
| H (comparison) | 100 | — | — | 18.5 | 12 | 90 | 98 | 40 | D-E |

We claim:
1. A process for preparing molding composition comprising a mixture of (i) and (ii), wherein (i) is a thermoplastically processable, pulverulent molding material selected from an elastic-thermoplastic pulverulent molding material, a thermoplastic pulverulent molding material or combinations thereof, and (ii) is an elastic molding material, which comprises
   forming a latex of the pulverulent molding material, the elastic molding material and up to 5 parts, by weight, per 100 parts by weight of the latex solids, of an anionic emulsifier,
   coagulating the thus formed latex with a precipitation reagent comprising,
   (A) 0.1 to 3.0%, by weight of the latex solids, of a polyvinyl acetate having a molecular weight of 30,000 to 150,000 and a degree of hydrolysis of 60 to 96%, in the form of an aqueous solution, and
   (B) 0.01 to 1.0%, by weight of the latex solids, of a carboxylic acid, at a temperature of 75° to 140° C. to form the molding composition and an aqueous phase, and
   then separating the molding composition from the aqueous phase at a temperature of 60° to 140° C.
2. A process according to claim 1, wherein the latex contains up to 2 parts, per 100 parts by weight of latex solids, of the anionic emulsifier.
3. A process according to claim 1, wherein the precipitation reagent contains 0.1 to 1.0%, by weight of latex solids, of polyvinyl acetate.
4. A process according to claim 1, wherein the coagulation is effected at a temperature of 80° to 100° C.
5. A process according to claim 1, wherein the separation is effected at a temperature of 70° to 100° C.
6. A process in accordance with any one of claims 1 through 6, wherein the polyvinyl acetate has a degree of hydrolysis of 75 to 95%.
7. A process according to claim 6, wherein the carboxylic acid is acetic acid.

* * * * *